United States Patent
Naumov et al.

(10) Patent No.: US 7,886,599 B2
(45) Date of Patent: Feb. 15, 2011

(54) DEVICE FOR DETERMINING ACCELERATION

(75) Inventors: George Naumov, 10/18 Tar'ad, Ramat Gan (IL) 52503; Michael Naumov, 10/18 Tar'ad, Ramat Gan (IL) 52503

(73) Assignees: Michael Naumov, Tel Aviv (IL); George Naumov, Tel Aviv (IL)

( * ) Notice: Subject to any disclaimer, the term of this patent is extended or adjusted under 35 U.S.C. 154(b) by 0 days.

(21) Appl. No.: 11/489,947

(22) Filed: Jul. 20, 2006

(65) Prior Publication Data

US 2007/0295090 A1 Dec. 27, 2007

(51) Int. Cl.
*G01P 15/00* (2006.01)
(52) U.S. Cl. .................. 73/514.09; 73/514.11
(58) Field of Classification Search ............... 73/514.02, 73/514.05, 514.09, 514.11, 514.13, 1.75
See application file for complete search history.

(56) References Cited

U.S. PATENT DOCUMENTS 3,461,730 A * 8/1969 Peters ............... 73/514.09
4,345,473 A    8/1982 Berni et al.
6,851,317 B2   2/2005 Naumov et al.
2003/0177830 A1* 9/2003 Naumov et al. .......... 73/514.09
2007/0131028 A1* 6/2007 Naumov et al. ............... 73/488
2007/0295090 A1   12/2007 Naumov et al.

OTHER PUBLICATIONS

U.S. Appl. No. 11/330,744, filed Jun. 14, 2007, M.Naumov et al, total document.

* cited by examiner

*Primary Examiner*—Helen C. Kwok

(57) ABSTRACT

The technical solution provided can be implemented with the help of two miniature vessels and even one miniature vessel filled with the flowing media. It is based on determining the pressures difference in particular points, wherein the pressures caused by the cross accelerations and other disturbance factors are considered to be equal, and the ones caused by the acceleration determined are considered to be different. The present solution enables one to determine the acceleration with higher accuracy even with big tilting (practically up to 360°) of the platform, in particular, on the body of a moving object, the acceleration whereof is determined.

1 Claim, 1 Drawing Sheet

DEVICE FOR DETERMINING ACCELERATION

FIELD OF ART

The technical solution concerns accurate determination of acceleration (horizontal or vertical) even with big base (platform) tilting, whereon the determination of the acceleration being performed.

This device can be used in the navigational, piloted, marine systems and devices, in the systems of stabilization and safety of the vehicles movement, for seismographic measurements and vibrations measurements, in medicine and etc.

BACKGROUND OF THE INVENTION

The vector of the acceleration $\alpha$ can be resolved into 3 mutually perpendicular components, one whereof $\alpha_\eta$ is directed along the vertical ($\eta$-axis direction). Two other components $\alpha_\xi$ and $\alpha_\zeta$ are considered to be located in the horizontal plane and directed along two mutually perpendicular axes $\xi$ and $\zeta$, correspondingly.

Let's assume the component $\alpha_\eta$ be called vertical acceleration, the component $\alpha_\xi$-longitudinal acceleration, $\alpha_\zeta$-lateral (transverse) acceleration, correspondingly.

When determining $\alpha_\xi$, accelerations $\alpha_\eta$ and $\alpha_\zeta$ are said to be cross, and the axes $\eta$ and $\zeta$ along which the they are directed are considered to be cross-sectional axes.

When determining $\alpha_\zeta$, accelerations $\alpha_\eta$ and $\alpha_\xi$ are said to be cross, and the axes $\xi$ and $\zeta$ along which they are directed are considered to be cross-sectional axes.

When determining $\alpha_\eta$, accelerations $\alpha_\xi$ and $\alpha_\zeta$ are said to be cross, and the axes $\xi$ and $\zeta$ along which they are directed are considered to be cross accelerations.

The cross accelerations are considered to be harmful. Therefore, their harmful influence should be prevented.

The accelerations $\alpha_\xi$, $\alpha_\zeta$ and $\alpha_\eta$ are presently determined by the devices called accelerometers [1]. Their main drawback is considered to consist in the following: with tilting (relative to the horizontal plane), even insignificant cross accelerations are expected to cause noticeable errors.

For preventing said errors the authors earlier developed the devices [2], [3], [4], [5]. However, said errors are prevented therein with said tilting for such small angles $v$ for which, with higher accuracy, one can consider $\cos v=1$, $\sin v=v$.

The present technical solution has for an aim to provide an accurate determination of the acceleration (horizontal or vertical), irrespective of the disturbance factors, particularly, cross accelerations, even with big tilting and with joint application of the devices for determining horizontal and vertical accelerations—practically with any tilting.

SUMMARY OF THE INVENTION

To meet the said object the acceleration (horizontal or vertical) is determined by pressure difference in particular points, wherein the pressures caused by cross accelerations, irrespective of tilting, are said to be equal, and the ones caused by the acceleration to be determined are considered to be different. Said points along the cross-sectional axes, irrespective of tilting, are acted upon by the columns of the flowing liquid being of equal length, and the ones acting along the axis along which determination is made of the acceleration are considered to be different.

Let's assume further, by way of example, the axis $\xi$ to be located in the plane passing through the vertical and longitudinal axes of a moving object, in particular, through its lines parallel to said axes. Similarly, the axis $\zeta$ is assumed to be located in the plane passing through the vertical and cross-sectional (lateral) axes of a moving object, in particular, through the lines parallel to said axes.

The device provided comprises miniature hollow sealed vessels, in particular, one vessel, pressure sensors and differential scheme connected therewith, a scheme being switched to said sensors. At the output of said scheme a signal of the acceleration to be determined (the component of the acceleration vector) is taken off.

Use can be made of different numbers of vessels. Further, by way of example, there are shown two-vessel and one-vessel devices for determining acceleration. But herewith, use is made of every two pressure sensors for two predominantly similar, inner cavities, filled with the flowing media (liquid, gas or their mixture).

The number of the pressure sensors is to be even, in particular, two pressure sensors connected with the vessels, in particular, with one vessel.

The vessels (a vessel) are considered to be fastened on the platform, in particular, on the body of a moving object, the acceleration whereof is being determined.

The inner cavities of each vessel are spherical (in particular, each inner cavity is a hemisphere) and counter-oriented (the cross-sections of the inner cavities of the vessels and the contours of said cross-sections are counter-oriented). Under spherical we will mean such shape, wherewith part of the surface of the inner cavity of the vessel is, at least, like spherical surface. Said counter-orientation is implemented by the location of the spherical parts of said cavities of said vessels (vessel) of one and the same radius on either side of the centers (center) of the spherical surfaces.

In a two-vessel device the inner cavity of each vessel consists of two counter-oriented spherical parts (the contours of their cross-sections are counter-oriented) of different radii, in particular, with the common center.

The plane passing, in particular, through this center and the line parallel to the vertical axis of a moving object (in particular, through said axis) is considered to have the contour of the cross-section of the inner cavity of the vessel. Said contour is considered to have opposite-located two points, the outermost along the axis perpendicular to the axis, along which determination is made of the acceleration (said points are located on the surface of the inner cavity of the vessel). When determining the horizontal acceleration ($\alpha_\xi$ and $\alpha_\zeta$), said outermost points are located on the vertical axis of a moving object (or on the line parallel to it). When determining the vertical acceleration ($\alpha_\eta$), said outermost points are located on the line perpendicular to the vertical axis of a moving object. With tilting, said outermost points remain as such, the outermost points (along the vertical or horizontal).

As a differential scheme use can be made of an electrical bridge, a magnetic amplifier according to the differential scheme, the scheme of difference of electrical resistances (active and reactive).

As the flowing media use can be made of silicone oil (the density whereof does not practically depend on the temperature within wide ranges of its changes), ligroin and others.

As pressure sensors in a two-vessel device use can be made of any among pressure sensors known. It is more preferable that the pressure sensors with sensitive elements of the semiconductor type be used, which are known to have changes of specific resistance caused by the pressure. Herewith, it is necessary to choose the pressure sensors with similar parameters of their sensitive elements (a two-vessel device with two sensitive elements of pressure).

For preventing any harmful influence of the cross accelerations in the present solution provided, in particular, use is made of:

similar counter-oriented inner cavities of the vessels;
similar location of the points of determining pressure (in particular, the centers of the spherical parts) on the similarly located straight lines connecting the corresponding said outermost points in said planes.

For preventing any harmful influence of the parameters spread of two sensitive elements of pressure use is made of a one-vessel device (determining acceleration) with one sensitive element. The inner cavity of said one-vessel device is like a hollow sphere, two hemispheres whereof are separated by a flexible diaphragm with holes.

In a one-vessel device as pressure sensors use is made of capacitors, the electrodes whereof are said diaphragm (with holes) and the walls of the inner cavities (hemispheres) being electrically insulated from each other and the latter being located on either side from the former. By way of example, as a differential scheme use is made of an electrical bridge. Into some neighboring arms of said bridge there are said capacitors (their electrodes) included, and into the other neighboring arms—elements with predominantly similar electrical resistances, correspondingly. Through the input diagonal said electrical bridge is fed by the electrical voltage, and from the output diagonal of said bridge there is the signal of the acceleration determined taken off.

Since the cross accelerations are not considered to make any harmful influence, irrespective of tilting, the sensitivity axis in the device for determining the horizontal acceleration is always said horizontal, and in the device for determining the vertical acceleration is always said directed along the vertical.

Both two-vessel and one-vessel device (for determining the acceleration) are considered to have sensitivity thread equal to zero. This is explained by the fact that the point of determining pressure (in particular, said center) is acted upon by the pressure of filling the vessel with the flowing media and the column of said media to be located over the point of determining pressure. Therefore, any sensitive element (of pressure) used is said to be in the balanced position. Due to the above, with the most insufficient change of the acceleration under determination at the output of said differential scheme there occurs the signal proportional to said acceleration.

Since the lengths of the columns of the flowing media acting on said centers (used as the points of determining the pressure) are considered to be equal, irrespective of tilting, to the radii R and r of the spherical parts of each inner cavity of the vessel (i.e. they don't change with tilting), then in the two-vessel device, in this case, said signal is considered to be determined by the equation $$a = \frac{u_1 - u_2}{k\rho(R-r)}, \quad (1)$$

where $\alpha$ ($\alpha_\xi$ or $\alpha_\zeta$, or $\alpha_\eta$)—the acceleration determined,
$u_1, u_2$—signals (in the form of the electrical voltages) provided to the differential scheme from the pressure sensors,
k—constant coefficient,
$\rho$—density of the flowing media.

In the one-vessel device said signal is determined by the equation $$a = \frac{C_1 + C_2}{k\rho R}, \quad (2)$$

where $C_1$, $C_2$—electrical capacitances of said capacitors.

The capacitances $C_1$ and $C_2$ are totaled (which increases sensitivity), since with the diaphragm deflection (under the influence of the acceleration determined) one capacitance is increasing and another one is decreasing.

Since two inner cavities of the vessels (vessel) used are considered to be similar and use is made of the differential scheme, the present technical solution is to provide elimination of any harmful influence of not only cross accelerations but also other disturbance factors, in particular, vibrations and temperature.

With tilting at the angle $v \approx 45°$ and more, the device for determining the horizontal acceleration turns into the device for determining the vertical acceleration, and the device for determining the vertical acceleration turns into the device for determining the horizontal acceleration, accordingly. Therefore, with joint application of said devices and corresponding displacement of the outermost points in terms of one another, the determination of the acceleration (horizontal and vertical) is expected to be possible with tilting within the range to 360°, i.e. with any tilting.

The operation of the device provided (two-vessel or one-vessel) consists in determining pressures in particular points (in particular, in the centers of the spherical surfaces) by means of pressure sensors, determining the difference of said pressures by means of the differential scheme and taking the signal of the acceleration from the output of said differential scheme.

BRIEF DESCRIPTION OF THE DRAWINGS

The present technical solution is explained and illustrated, by way of example, in the accompanying drawings, in which it is shown as follows:

On the accompanying drawing the vessels and the thickness of their walls are not shown. In FIGS. 1, 2 the pressure sensors are not shown, but the points for determining pressures by these sensors are shown.

DETAILED DESCRIPTION OF THE INVENTION

The present technical solution is based on determining the pressures difference to be determined in particular points of the inner cavities of the hollow vessels, in particular, one vessel, wherein the pressures caused by the cross accelerations being equal, and those caused by the acceleration determined (horizontal or vertical) being different, correspondingly.

The points for determining pressures are chosen as such that even with tilting in the operating condition, they are acted upon along the cross-sectional axes by the columns of the flowing media of equal length, and on the axis along which determination is made of the acceleration, are of different length. Therefore, the cross accelerations are not considered to make any harmful influence on determining the acceleration required, as a consequence, the sensitivity axis, irrespective of tilting, in the device for determining horizontal acceleration is always directed along the horizontal, and in the device for determining the vertical acceleration is always directed along the vertical.

Figure 3:
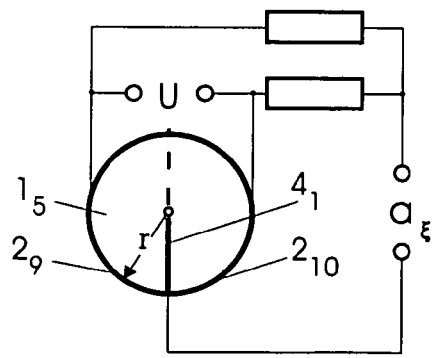

By way of examples, provision is made of the two-vessel devices for determining acceleration (FIG. 1, 2) and one-vessel device for determining acceleration (FIG. 3, 4).

In FIGS. 1, 2, 3, 4 the vessels are not shown, and the cross-sections of the inner cavities $1_1$ and $1_2$, $1_3$ and $1_4$, $1_5$ and $1_6$ of the hollow sealed vessels are shown. On these drawings there are shown arcs $2_1$ and $2_2$, $2_3$ and $2_4$, $2_5$ and $2_6$, $2_7$ and $2_8$, $2_9$ and $2_{10}$, $2_{11}$ and $2_{12}$ of the contours of these cross-sections.

On these drawings these cross-sections are shown counter-oriented (the arcs of one and the same radius are located on either side from their centers).

By way of example, in FIGS. 1, 2, 3, 4 there are shown the cross-sections of the inner cavities of the hollow vessels in the plane passing through the vertical and longitudinal axes of a moving object, the acceleration ($\alpha_\xi$ or $\alpha_\eta$) whereof is determined, in particular, through the lines parallel to said axes.

The inner cavities of the vessels are filled with the flowing media (liquid, gas or their mixture). As the liquid use can be made of silicone oil (the density whereof being practically unchangeable within a wide range of temperature changes) ligroin and others.

Figure 1:
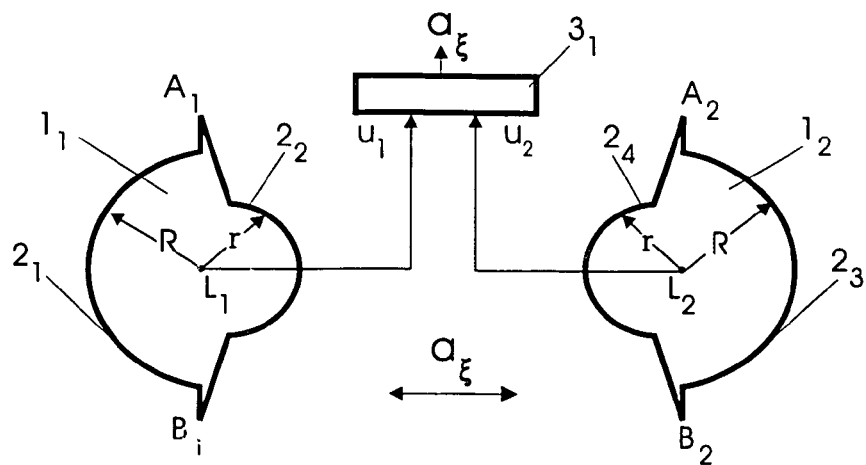
FIG. 1—a scheme of a two-channel device for determining the horizontal acceleration, FIG. 2—a scheme of a two-channel device for determining the vertical acceleration, FIG. 3—a scheme of a one-channel device determining the horizontal acceleration, FIG. 4—a scheme of one-vessel device for determining the vertical acceleration.
Figure 2:
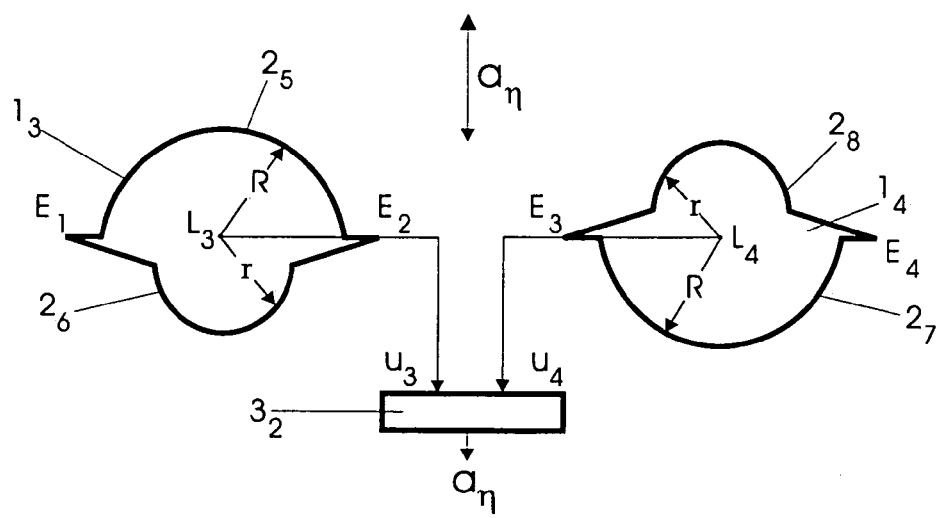

In FIGS. 1, 2 there are not shown pressure sensors, and there are shown points $L_1$ and $L_2$, $L_3$ and $L_4$ for determining pressures by said sensors. These points can be, in particular, used as the centers of the spherical parts of the inner cavities of the vessels by means of the radii R and r.

The pressure signals in said points are provided to the differential scheme (differential block), at the output whereof there is taken a signal of the acceleration determined (in our example $\alpha_\xi$ or $\alpha_\eta$). In FIG. 1 the differential scheme is indicated by $3_1$, in FIG. 2—by $3_2$, and in FIGS. 3, 4 as said scheme use is made of an electrical bridge, accordingly.

As pressure sensors in FIGS. 1, 2 use can be made of any known pressure sensors. It is more preferable that the pressure sensors with sensitive elements of semiconductor type be used, wherein under the pressure influence specific resistance changes.

In FIG. 1 the outermost (along the vertical) points are the upper (A1 and $A_2$) and lower ($B_1$ and $B_2$), remaining as such (upper and lower) with tilting in the operating condition In FIG. 2 the outermost (along the horizontal) are the extreme points ($E_1$ and $E_2$, $E_3$ and $E_4$) remaining as such (extreme) with tilting in the operating condition.

Figure 4:
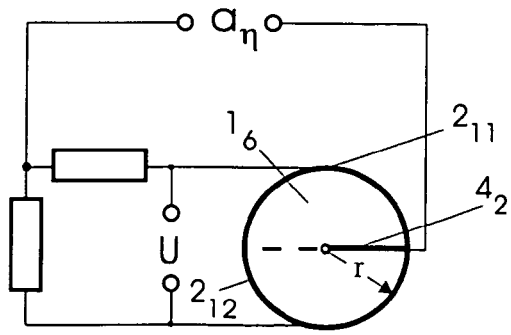

Further, first there will be provided a two-vessel device for determining the acceleration (FIGS. 1, 2), and then a one-vessel device for determining the acceleration (FIGS. 3, 4).

In FIGS. 1, 2 there are shown cross-sections of the inner cavities $1_1$ and $1_2$, $1_3$ and $1_4$, of two hollow sealed vessels.

Each of these cavities is considered to consist of two spherical parts of the different radius (R and r), but with the common center (in particular, $L_1$ and $L_2$).

In FIGS. 1, 2 there are shown contours of the cross-sections of said cavities passing through the centers $L_1$ and $L_2$. Such contour is considered to comprise the arcs of a different radius: arcs $2_1$ and $2_3$, $2_5$ and $2_7$ of the radius R, as well as arcs $2_2$ and $2_4$, $2_6$ and $2_8$, of the radius r.

The inner cavities of the vessels are used to be similar, in FIG. 1 and in FIG. 2, correspondingly.

The positions of the points $L_1$ and $L_2$, $L_3$ and $L_4$ are chosen to be similar in these planes, correspondingly.

Therefore, the columns lengths of the flowing media acting on these points under the influence of the horizontal lateral acceleration $\alpha_\zeta$ are considered to be equal one another, irrespective of tilting. As a consequence, the acceleration $\alpha_\zeta$ is not expected to make any harmful influence, even with tilting, on determining the horizontal longitudinal acceleration $\alpha_\xi$ (FIG. 1) and on determining the vertical acceleration $\alpha_\eta$ (FIG. 2).

Owing to presence of the outermost, along the vertical, points ($A_1$ and $B_1$, $A_2$ and $B_2$) the vertical acceleration $\alpha_\eta$ is not expected any harmful influence, either, even with tilting, on determining the acceleration $\alpha_\xi$ (FIG. 1).

Let's show it by way of example: the locations of the points $L_1$ on the straight line $A_1B_1$ and the locations of the point $L_2$ on the straight line $A_2B_2$, and choosing $A_1B_1=A_2B_2$, $B_1L_1=B_2L_2$. The points $L_1$ and $L_2$ are acted upon by the columns of the flowing media, the heights whereof being $h_1$ and $h_2$, $h_3$ and $h_4$. These heights are measured from the outermost points $A_1$ and $A_2$, $B_1$ and $B_2$ up to the horizontals (straight lines perpendicular to the vertical) passing through the points $L_1$ and $L_2$. In particular, in the initial position $h_1=A_1L_1$, $h_2=A_2L_2$, $h_3=B_1L_1$, $h_4=B_2L_2$. With tilting at the angle v, we have $$h_1=A_1L_1 \cos v, h_2=A_2L_2 \cos v, h_3=B_1L_1 \cos v,$$
$$h_4=B_2L_2 \cos v \qquad (3)$$

But since choice is made of $A_1L_1=A_2L_2$, $B_1L_1=B_2L_2$, in particular, $A_1L_1=A_2L_2=B_1L_1=B_2L_2$, then $h_1=h_2=h_3=h_4$. This means that with tilting the heights of the columns of the flowing media acting on the points $L_1$ and $L_2$, being changed with tilting, remain to be equal. Due to that, determining $\alpha_\xi$ is not expected to depend on the influence of $\alpha_\eta$.

Let's consider the operation of the device of the horizontal acceleration $\alpha_\xi$ (FIG. 1) in case of applying the centers of said spherical parts as the points for determining pressure.

Let the acceleration $\alpha_\xi$ in FIG. 1 be directed from right to left. In this case the point $L_1$ is acted by the column of the flowing media at length R, the point $L_1$ is acted upon by the column of the flowing media at length r. Therefore, in these points there occur pressures $P_1$ and $P_2$, equal to $$P_1=\rho\alpha_\xi R, P_2=\rho\alpha_\xi r \qquad (4)$$

The signals of these pressures $u_1$ and $u_2$ are provided to the differential scheme $3_1$ at the output whereof there is taken a signal $$a_\xi = \frac{u_1 - u_2}{k\rho(R-r)}, \text{ where } u_1 \gg u_2 \qquad (1)$$

In case the acceleration $\alpha_\xi$ in FIG. 1 is directed from left to right, then $$a_\xi = \frac{u_2 - u_1}{k\rho(R-r)}, \text{ where } u_2 \gg u_1 \qquad (5)$$

From (1) and (5) it follows that
with tilting the difference of the lengths of columns of the flowing media (R-r) acting on the points $L_1$ and $L_2$ is considered to remain stable,
the device for determining the horizontal acceleration $\alpha_\xi$ is considered to determine not only the module of said acceleration but also its direction.

The device for determining the horizontal lateral acceleration $\alpha_\zeta$ is the same as the device for determining the horizontal longitudinal acceleration $\alpha_\xi$ having the same merits. The difference consists in the fact that the cross-sections of the inner cavities of the vessels with the counter-orientation are located in the plane passing through the vertical and cross-sectional axes of a moving object the acceleration $\alpha_\zeta$ whereof is determined.

Let's consider the peculiarities of a two-vessel device for determining the vertical acceleration $\alpha_\eta$ (FIG. 2):

the inner cavities (as well as their contours) are counter-oriented unlike the devices for determining the horizontal acceleration along the vertical and not along the horizontal;

presence, irrespective of tilting, of the outermost (along the horizontal) points $E_1$ and $E_2$, $E_3$ and $E_4$, the location, by way of example, of the points for determining pressure $L_3$ and $L_4$ on the straight lines $E_1E_2$, $E_3E_4$, correspondingly, when choosing $E_1L_3=E_3L_4$, $E_2L_3=E_4L_4$ are considered to prevent any harmful influence of the horizontal acceleration (in our example, $\alpha_\xi$);

determination is made of the vertical acceleration $\alpha_\eta$ both according to the module and to the sign.

In two-vessel devices determining the acceleration (FIGS. 1, 2) use is made of the two pressure sensors with two sensitive elements of pressure (each pressure sensor having its sensitive element of pressure). Therefore, it is necessary to choose the pressure sensors, the sensitive elements whereof having similar parameters, which is considered to be of some difficulty.

For preventing any harmful influence of the parameters spread of sensitive elements of pressure the device is made for determining the acceleration with one sensitive element of pressure in the form of the flexible diaphragm with holes (FIGS. 3, 4.).

In FIG. 3 there is shown a one-vessel device for determining the horizontal acceleration ($\alpha_\xi$ or $\alpha_\zeta$), and in FIG. 4—a one-vessel device for determining the vertical acceleration ($\alpha_\eta$).

Each of said devices is made in the form of one vessel, the inner cavities $1_5$ and $1_6$ whereof being in the form of hemispheres are separated by a flexible diaphragm ($4_1$ and $4_2$) with holes (presence of holes is shown by dotted line).

Said diaphragm and the walls of the inner cavities located on either side therefrom are electrically insulated from each other and are electrodes of two capacitors. Said capacitors are included in some neighboring arms of said bridge the elements with electrical resistances of the equal value are included, which is more preferable.

Said diaphragm is like an aggregate of plurality of pairs of the points to be similarly located on either side therefrom. Since the thickness of said diaphragm is considered to be insignificant, then geometrically each pair of the points of that kind can be considered as one point (though physically these are different points since they are located in different hemispheres). Therefore, with tilting, the points of each said pair are acted upon by the columns of similar length. Due to that, with tilting, said diaphragm is not expected to change its position (is not deflected).

Under the influence of the acceleration to be determined the difference of pressure is created, as a consequence, said diaphragm is deflected. Herewith, capacitance of one capacitor increases and of another decreases, correspondingly. As a consequence, at the output of said electrical bridge there occurs voltage proportional to the acceleration determined.

Since every point for determining pressure (on the diaphragm) is acted upon by the pressure of filling the vessel with the flowing media and the pressure caused by the column of this media located over this point, then the sensitivity thread of each device provided is equal to zero (thus, it is not necessary to overcome non-sensitivity zone). This means that the most insignificant acceleration causes the signal at the output of the differential scheme.

Since the inner cavities of the vessels (vessel) are similar, the location of the points of determining the pressure in them is similar and use is made of the differential scheme, then not only cross accelerations but also other disturbance factors (in particular, vibrations and temperature changes) are not considered to cause any harmful influence on the accuracy of determining the acceleration.

Since with tilting (relative to the horizontal plane) at the angles $v \approx 45°$ and more the device for determining the horizontal acceleration turns into the device for determining the vertical acceleration and, vice versa, then the joint application of said devices with corresponding displacement of the outermost points one relative to another enables it to accurately determine the acceleration (both horizontal and vertical) irrespective of tilting practically within the range of 360°, i.e. with any tilting.

The operation of the technical solution provided is based on determining the pressures difference determined in particular points of the flowing media, providing the signals of said pressures to said differential scheme and taking off the signal of the acceleration determined from the output of said scheme.

Considerable differences of the technical solution provided compared with the prior art are as follows:

the inner cavity of the vessel in a two-vessel device is considered to consist of two counter-oriented spherical parts (contours) of different radii;

use is made, in particular, of the centers of said spherical parts as points of determining the pressure in a two-vessel device;

counter-orientation of the inner cavities of the vessels (in a two-vessel device) is made by means of the location of said spherical parts of one and the same radius on either side from the centers of said parts;

the inner cavities of a one-vessel device are made in the form of two hemispheres separated by a flexible diaphragm with the holes.

Addition

The flowing media which fills the moving vessel in full is considered to be unmovable relative to the latter. Therefore, for determining the pressure in any point of said media there is only one opportunity: by means of the main (fundamental) equation of hydrostatics (Eulerian equation).

Let's show, by way of a simple example, the application of said equation.

Let a hollow sphere having radius R be filled with liquid in full move at constant by value (module) acceleration $\alpha$ ($\alpha$=const).

It is required that the pressure P be determined in the center of this sphere caused by this acceleration.

In conformity with Eulerian equation said pressure is determined in this case by the equation:

$$P=\rho R\alpha_\eta + \rho R\alpha_\xi + \rho R\alpha_\zeta = \rho R(\alpha_\eta + \alpha_\xi + \alpha_\zeta), \qquad (1)$$

where $\alpha_\eta$—vertical component (vertical acceleration) of the vector $\alpha$ acting along the vertical;

$\alpha_\xi$, $\alpha_\zeta$—mutually perpendicular horizontal components of the vector α acting along the axes $\xi$ and $\zeta$;
ρ—density of liquid.

Note

The authors warn those skilled in art against misleading (fallacious) determination of said pressure in general case by means of the equation below:

$$P_1 = \rho R \alpha \quad (2)$$

Comparing (1) and (2) we see that in general case $P \neq P_1$ since $$\alpha_\eta + \alpha_\xi + \alpha_\zeta \neq \alpha \quad (3)$$

Herewith, the error may be rather noticeable.

REFERENCES

1. Berni, Albert J. "Vertical component accelerometer", U.S. Pat. No. 4,375,473, 1980
2. M. Naumov, G. Naumov. "Device for measuring horizontal acceleration", U.S. Pat. No. 6,851,317, 2005.
3. M. Naumov, G. Naumov "Device for measuring horizontal acceleration", Israel patent, 148474, 2005
4. M. Naumov, G. Naumov "Method for determining the vertical acceleration and the device for its implementation", Israel application, 172489, 2005
5. M. Naumov, G. Naumov "Method for determining the vertical acceleration and the device for its implementation", U.S. application Ser. No. 11/330,744, 2006

We claim:

1. A device for measuring acceleration comprising the following interconnected parts:

two sealed vessels filled with a flowing medium, provided with pressure sensors and connected to a mobile object, an inner cavity of each vessel comprising two counter-oriented spherical parts of different radii and with a common center, said common center serving as a point for pressure determination, each inner cavity having most remote points positioned on either side from said common center, said most remote points and said common centers being positioned in said inner cavities on parallel straight lines perpendicular to any axis chosen of a mobile object, the inner cavities of said two vessels being counter-oriented, a differential circuit connected to said pressure sensors, said differential circuit from an output of which a measured acceleration signal is taken, the acceleration signal independent of inclinations of the mobile object and of cross-accelerations.

* * * * *